United States Patent [19]
Lee

[11] Patent Number: 6,154,428
[45] Date of Patent: Nov. 28, 2000

[54] TECHNIQUE FOR SETTING SPEED OF OPTICAL DISK PLAYER ACCORDING TO CONDITION OF OPTICAL DISK

[75] Inventor: Ki-ju Lee, Suwon, Rep. of Korea

[73] Assignee: SamSung Electronics Co., Ltd., Suwon, Rep. of Korea

[21] Appl. No.: 09/109,035

[22] Filed: Jul. 2, 1998

[30] Foreign Application Priority Data

Jul. 2, 1997 [KR] Rep. of Korea ................. 97/30655
Jul. 15, 1997 [KR] Rep. of Korea ................. 97/32927

[51] Int. Cl.$^7$ ................................................. G11B 5/09
[52] U.S. Cl. ................................... 369/50; 369/54
[58] Field of Search ........................ 369/47, 48, 50, 369/53, 54, 58, 124.01, 124.14, 124.15; 360/25, 73.01, 73.03

[56] References Cited

U.S. PATENT DOCUMENTS

| | | |
|---|---|---|
| 4,855,847 | 8/1989 | Kanamaru . |
| 4,860,271 | 8/1989 | Yokogawa et al. . |
| 5,313,443 | 5/1994 | Iitsuka . |
| 5,577,013 | 11/1996 | Kobunaya . |
| 5,640,377 | 6/1997 | Watanabe et al. . |
| 5,648,949 | 7/1997 | Miyamoto et al. . |
| 5,745,457 | 4/1998 | Hayashi et al. . |
| 5,745,458 | 4/1998 | Oliver et al. . |
| 5,754,521 | 5/1998 | Yokota . |
| 5,761,171 | 6/1998 | Tobita . |
| 5,764,609 | 6/1998 | Araki et al. . |
| 5,768,252 | 6/1998 | Yokota . |

FOREIGN PATENT DOCUMENTS

| | | |
|---|---|---|
| 7-73571 | 3/1995 | Japan . |
| 8-115566 | 5/1996 | Japan . |
| 8-185665 | 7/1996 | Japan . |

*Primary Examiner*—Paul W. Huber
*Attorney, Agent, or Firm*—Robert E. Bushnell, Esq.

[57] ABSTRACT

A technique for setting a speed of an optical disk player according to a condition of an optical disk performs the steps of: setting a speed of the optical disk and an interval for measuring the condition, reading data recorded on the optical disk at the predetermined speed and at the same time measuring a data transfer rate, an access time, a compared value with respect to a reference value and an error of the disk of the predetermined interval, displaying the condition of the optical disk and the measured speed thereof on a screen, and setting a desired speed with reference to the condition and speed displayed on the screen. Thus, the speed may be set according to the condition of the optical disk, to check stability of the optical disk and enhance the condition of the optical disk.

14 Claims, 2 Drawing Sheets

TECHNIQUE FOR SETTING SPEED OF OPTICAL DISK PLAYER ACCORDING TO CONDITION OF OPTICAL DISK

CLAIM OF PRIORITY

This application makes reference to, incorporates the same herein, and claims all benefits accruing under 35 U.S.C. §119 from applications for METHOD OF DECIDING SPEED OF OPTICAL DISK PLAYER ACCORDING TO STATE OF OPTICAL DISK earlier filed in the Korean Industrial Property Office on Jul. 2, 1997 and there duly assigned Serial No. 30655/1997 and for METHOD OF DECIDING SPEED OF OPTICAL DISK PLAYER ACCORDING TO STATE OF OPTICAL DISK earlier filed in the Korean Industrial Property Office on Jul. 15, 1997 and there duly assigned Serial No. 32927/1997.

BACKGROUND OF THE INVENTION

1. Field of the Invention

The present invention relates to a technique for driving an optical disk, and more particularly, to a technique for setting the speed of an optical disk player according to the condition of the optical disk.

2. Description of the Related Art

Optical disk players have been developed which can read data at a high speed. If an optical disk player reads data at a high speed from an optical disk having a scratch or an error, then the data is corrupted.

Accordingly, when an error occurs in data read from a conventional optical disk at a high speed, the operating speed of the optical disk is reduced until no more errors occur. The reduced speed is set as a final speed.

The operating speed of the optical disk can be maintained or reduced, but cannot be increased even in a stable condition.

The following patents each discloses features in common with the present invention but do not teach or suggest the specifically recited technique for setting the speed of an optical disk player according to the condition of the optical disk in accordance with the present invention: U.S. Pat. No. 5,313,443 to Iitsuka, entitled Data Playback Apparatus For Realizing High Transfer Rate, U.S. Pat. No. 5,745,458 to Oliver et al., entitled Overlapped Spin-Up Process For Optical Disk Drive, U.S. Pat. No. 5,577,013 to Kobunaya, entitled Optical Information Control Device And Synchronizing Method Thereof, U.S. Pat. No. 4,855,847 to Kanamatu, entitled Video Disk Reproducing Device Having Improved Motor Speed Control, U.S. Pat. No. 5,764,609 to Araki et al., entitled Disk Data Reproducing Method And Apparatus For Reading Data At Arbitrary Speed, U.S. Pat. No. 5,648,949 to Miyamoto et al., entitled Method And Apparatus For Information Reproduction At Variable Reference Level, U.S. Pat. No. 5,745,457 to Hayashi et al., entitled Optical Disk Player With Coarse And Fine Speed Control, U.S. Pat. No. 5,640,377 to Watanabe et al., entitled Rotation Information Detecting Apparatus And Method, U.S. Pat. No. 5,754,521 to Yokota, entitled Recording Medium Having A First Management Area For Managing A First Attribute And A Second Management Area For Managing A Second Attribute Of A Program Recorded In A Recording Area, U.S. Pat. No. 5,768,252 to Yokota, entitled Method And Apparatus For Reproducing A Recording Medium Having A First Management Area For Managing A First Attribute And A Second Management Area For Managing A Second Attribute Of A Program Recorded In A Recording Area, U.S. Pat. No. 5,761,171 to Tobita, entitled Generating Data Detecting Threshold Levels From Reference Patterns Recorded In An Optical Disk, Such As A Magneto-Optical Disk, U.S. Pat. No. 4,860,271 to Yokogawa et al., entitled Servo Circuit For Generating A Tracking Error Signal For Optical Disk Player.

SUMMARY OF THE INVENTION

To solve the above problems, it is an object of the present invention to provide a technique for setting a speed of an optical disk player according to a condition of an optical disk.

Accordingly, to achieve the above object, there is provided a technique for setting a speed of an optical disk player according to a condition of an optical disk which performs the steps of: (a) setting a speed of the optical disk and an interval for measuring its condition; and (b) reading data recorded on the optical disk at the predetermined speed of step (a) and at the same time measuring a data transfer rate, an access time, a compared value with respect to a reference value and an error of the disk of the predetermined interval.

It is preferable that the technique further performs a step (c) of displaying the condition of the optical disk and the speed thereof measured in step (b) on a screen, and a step (d) of setting a desired speed with reference to the condition and speed displayed on the screen in step (c).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
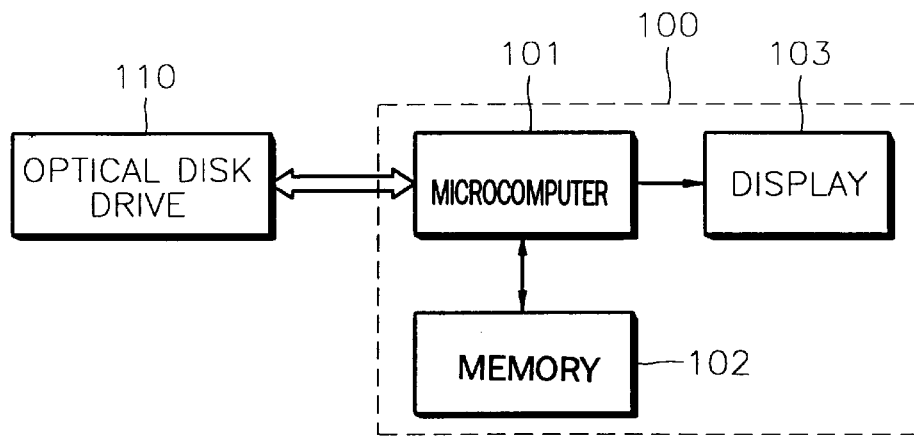
FIG. 1 is a block diagram showing an apparatus for setting a speed of an optical disk player according to a condition of an optical disk.

Referring to FIG. 1, an apparatus for setting a speed of an optical disk player is comprised of a computer 100 and an optical disk drive 110 in which an optical disk is loaded. The computer 100 includes a microcomputer 101 for generating a display control signal for measuring and displaying a condition of the optical disk drive 110 according to a speed thereof, and determining the speed, a memory 102 for storing a condition of the optical disk according to the speed measured by the microcomputer 101, and a display 103 for displaying the condition of the optical disk according to the speed stored in the memory 102.

Figure 2:
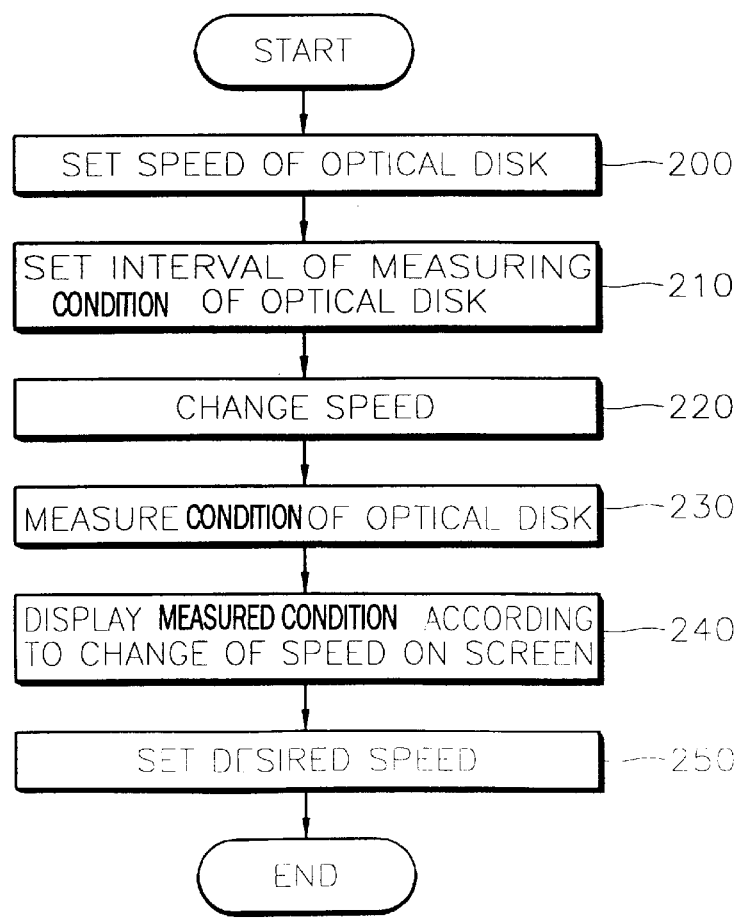
FIG. 2 is a flowchart showing a method of setting a speed of an optical disk player according to a condition of an optical disk of the present invention.

Referring to FIG. 2, a method of setting a speed of an optical disk player according to a condition of an optical disk includes the steps of setting the speed of the optical disk (step 200), setting an interval for measuring a state of the optical disk (step 210), changing the speed of the optical disk (step 220), measuring the condition of the optical disk according to change in the speed (step 230), displaying the measured condition on a screen (step 240) and setting a desired speed (step 250).

Figure 3:
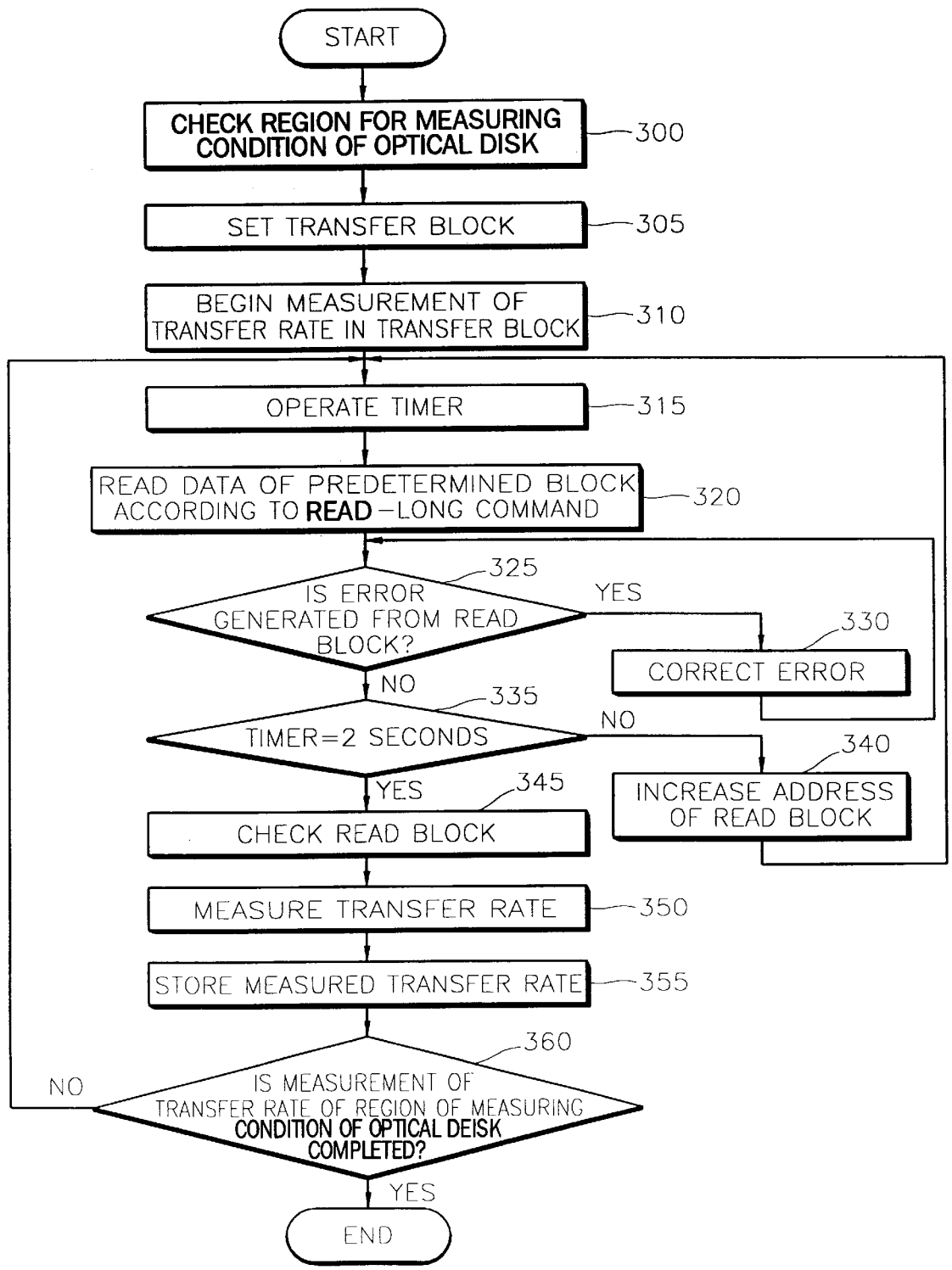
FIG. 3 is a flowchart showing a method of measuring a transfer rate in the condition of the optical disk of FIG. 2.

Referring to FIG. 3, a technique for measuring a transfer rate in the condition of the optical disk of FIG. 2 includes the steps of checking a region of measuring the condition of the optical disk (step 300), setting a transfer block (step 305), beginning measurement of the transfer rate of the predetermined transfer block (step 310), operating a timer (step 315), reading data of the block by a read-long command (step 320), checking whether an error occurs in data of the reading block (step 325), correcting the error (step 330), checking whether the time period measured by the timer is 2 seconds (step 335), increasing an address of a block to be read (step 340), checking (step 345), measuring the transfer rate by the time (2 seconds) and a number of the reading block (step 350), storing the transfer rate (step 355) and checking whether the measurement of the transfer rate in the region of measuring the condition of the optical disk has been completed (step 360).

The technique for setting the speed of the optical disk player will be described in detail with reference to FIGS. 1 through 3.

The speed of the optical disk is set (step 200). The speed of the optical disk is set by transferring a command of the computer 100. The computer 100 transfers the command to the optical disk 110 through an advanced technology attachment packet interface (ATAPI, not shown).

The ATAPI transfers data and a command to the computer 100 or the optical disk drive 110. For instance, if the microcomputer 101 of the computer 100 commands the optical disk driver 110 to perform a set CD-ROM speed command, the command is transferred to the optical disk driver 110 through the ATAPI. The speed of the optical disk is set to an arbitrary value such as an odd-numbered speed, an even-numbered speed or a random value. Also, a menu for setting the optical disk speed may be displayed on the screen, to be freely selected by a user.

After setting the speed, the interval of the optical disk for measuring the condition of the disk is set (step 210). The interval of the optical disk may be arbitrarily set by a frame, track or sector, etc. Also, a menu for setting the optical disk interval may be displayed on the screen, to be freely selected by a user.

After setting the speed and the interval of the optical disk, the speed of the optical disk is changed to the set speed in the set interval (step 220). The microcomputer 101 generates a speed changing control signal to drive at the set speed and checks whether the optical disk is exactly driven at the set speed.

When the optical disk reproduces at the set speed, the microcomputer 101 measures the condition of the optical disk by data transferred through the ATAPI in the set interval of the optical disk (step 230). The condition of the optical disk which is measured in the computer 100 is a data transfer rate, an access time, a compared value with respect to a reference value and a disk error.

The data transfer rate is calculated according to bytes of data and the number of blocks read per unit time. The technique for measuring the transfer rate is described in detail as follows.

The region for measuring the set condition of the optical disk is checked, and thus the size of the transfer block for measuring the transfer rate is set (steps 300 and 305). The transfer blocks are set to 2–32 Kbytes. For instance, the transfer block is set to 2 Kbytes.

After the size of the transfer block is set, the timer is operated by the microcomputer 101 (steps 310 and 315). The time period counted by the timer may be arbitrarily set. In the example of the present invention, the time period is assumed to be 2 seconds.

At the same time as operating the timer, the microcomputer 101 reads the data written on the optical disk in the transfer block size set by the read-long command (step 320). The read-long command is used to read the block data of the set optical disk. Also, the data of a block read according to the read-long command is more than that according to a general read command. The address of the optical disk, a size of the block and a mode to be read are set before reading the data of the block according to the read-long command.

The address of the optical disk is determined by a min:sec:frame, and the block is determined by the predetermined size, i.e. 2 Kbytes. The mode to be read is determined by a raw mode or a cooked mode. The raw mode and the cooked mode are for reading the interval of the optical disk in 2352 byte units and 2048 byte units, respectively.

The microcomputer 101 checks whether an error is generated during reading each block, and if an error is generated, the error is corrected (steps 325 and 330). If no error is generated, the microcomputer 101 checks whether the time period counted by the timer is 2 seconds (step 335). When the time period of the timer is less than 2 seconds, the microcomputer 101 increases the address of the data of the block to be read until the time period becomes 2 seconds (step 340).

When the time period counted by the timer is 2 seconds, the microcomputer 101 checks the number of blocks read in 2 seconds and measures the transfer rate (steps 345 and 350). The transfer rate is expressed by the number of blocks read during the transferred time, and the size of the predetermined block, as follows.

$$\text{transfer rate} = \frac{\text{(the number of red blocks)} \times \text{(size of block)}}{\text{transfer time}}$$

For instance, when the number of blocks read is 3, the size of the block is 2 Kbytes and the transfer time is 2 seconds, the transfer rate is expressed as follows.

$$\text{transfer rate} = \frac{(3) \times (2\,\text{Kbyte})}{2\,\text{sec}} = 3\,\text{kbyte/sec}$$

The transfer rate measured by the microcomputer 101 is stored in the memory 102 (step 355). The address of the optical disk as well as the transfer rate is also stored in the memory 102.

The microcomputer 101 checks whether the measurement of the transfer rate of the region of measuring the optical disk is completed, and if not completed, the timer re-operates and the transfer rate is also measured by reading the blocks (step 360).

The access time is obtained by measuring the time required for reading request data from the optical disk.

The compared value with respect to the reference spec is obtained by comparing the transfer rate of the measured data to the reference data and access time of the measured data to the reference data.

The error of the optical disk is caused by a focusing error generated between the optical disk and the optical pickup and a tracking error caused by eccentricity of the optical disk and shaking of an axis of a turntable. The measured transfer rate, the access time, the compared value with respect to the reference spec, and the error of the disk are stored in the memory 102.

The microcomputer 101 outputs a control signal to display on a screen the data transfer rate, the access time, the compared value with respect to the reference spec and the error of the disk, which are stored in the memory 102 (step 240).

A desired speed is set with reference to the speed displayed on the screen, the data transfer rate, the access time, the compared value with respect to the reference spec, and the disk error, which depend on the data transfer rate (step 250). The speed of optical disk may be set to an arbitrary value which is more than or less than the maximum speed.

Accordingly, the speed may be arbitrarily set according to the condition of the optical disk, to check stability of the optical disk and enhance the condition of the optical disk.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of setting a speed of an optical disk player according to a condition of an optical disk comprising the steps of:

(a) setting a speed of the optical disk and an interval for measuring the condition; and (b) reading data recorded on the optical disk at the predetermined speed of step (a) and at the same time measuring a data transfer rate, an access time, a compared value with respect to a reference value and an error of the disk of the predetermined interval.

2. The method of claim 1, further comprising step (c) of displaying the condition of the optical disk and the speed thereof measured in step (b) on a screen.

3. The method of claim 2, further comprising step (d) of setting a desired speed with reference to the condition and speed displayed on the screen in step (c).

4. The method of claim 1, further comprising displaying a menu on a screen to be freely selected by a user, when setting the speed and the interval for measuring the condition in step (a).

5. The method of claim 1, the method of measuring a transfer rate of step (b) comprising the substeps of:

(b1) setting transfer blocks of the optical disk to check a set interval;

(b2) reading the set blocks of step (b1) by operating the timer for a predetermined period of time;

(b3) checking the number of blocks read when the timer has counted the predetermined period of time of step (b2); and (b4) measuring the transfer rate according to the number of blocks and the predetermined period of time checked in step (b3).

6. The method of claim 5, further comprising correcting an error generated in step (b2) before performing step (b3).

7. The method of claim 5, further comprising operating the timer of step (b3) until the predetermined period of time is counted.

8. An apparatus for setting a speed of an optical disk player according to a condition of an optical disk comprising:

a setting means for setting a speed of the optical disk and an interval for measuring the condition; and a setting means for reading data recorded on the optical disk at the predetermined speed set by the setting means and at the same time measuring a data transfer rate, an access time, a compared value with respect to a reference value and an error of the disk of the predetermined interval.

9. The apparatus of claim 8, further comprising a display for displaying the condition of the optical disk and the measured speed thereof on a screen.

10. The apparatus of claim 9, said setting means setting a desired speed with reference to the condition and speed displayed on the screen.

11. The apparatus of claim 8, further comprising a display for displaying a menu on a screen to be freely selected by a user, when setting the speed and the interval for measuring the condition by said setting means.

12. The apparatus of claim 8, the means for measuring a transfer rate comprising:

a means for setting transfer blocks of the optical disk to check a set interval;

a means for reading the set blocks by operating the timer for a predetermined period of time;

a means for checking the number of blocks read when the timer has counted the predetermined period of time; and a means for measuring the transfer rate according to the number of blocks and the checked predetermined period of time.

13. The apparatus of claim 12, further comprising a means for correcting an error generated when reading the set blocks before checking the number of blocks.

14. The apparatus of claim 12, further comprising a means for operating the timer until the predetermined period of time is counted.

* * * * *